US007730036B2

(12) United States Patent
Blose et al.

(10) Patent No.: US 7,730,036 B2
(45) Date of Patent: Jun. 1, 2010

(54) EVENT-BASED DIGITAL CONTENT RECORD ORGANIZATION

(75) Inventors: Andrew C. Blose, Penfield, NY (US);
Joseph A. Manico, Rochester, NY (US);
Mark D. Wood, Penfield, NY (US);
Dale F. McIntyre, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 294 days.

(21) Appl. No.: 11/750,540

(22) Filed: May 18, 2007

(65) Prior Publication Data
US 2008/0288523 A1      Nov. 20, 2008

(51) Int. Cl.
*G06F 17/30* (2006.01)
(52) U.S. Cl. .................. 707/661; 707/804; 348/231.3
(58) Field of Classification Search .................. 707/9, 707/100–102, 104.1, 204
See application file for complete search history.

(56) References Cited

U.S. PATENT DOCUMENTS

| 6,704,716 B1 | 3/2004 | Force ............................ 705/80 |
| 7,007,076 B1 | 2/2006 | Hess et al. .................. 709/219 |
| 7,421,454 B2 * | 9/2008 | DeShan et al. ........... 707/104.1 |
| 7,525,578 B1 * | 4/2009 | Barbeau ................... 348/231.3 |
| 2003/0004916 A1 | 1/2003 | Lewis ............................ 707/1 |
| 2003/0236832 A1 | 12/2003 | McIntyre et al. ............ 709/204 |
| 2004/0143451 A1 | 7/2004 | McIntyre et al. ............... 705/1 |
| 2004/0199527 A1 * | 10/2004 | Morain et al. ............... 707/100 |
| 2005/0084259 A1 | 4/2005 | Manico et al. .............. 396/311 |
| 2005/0182651 A1 | 8/2005 | McIntyre et al. ............... 705/1 |
| 2006/0095540 A1 | 5/2006 | Anderson et al. ........... 709/217 |
| 2006/0114516 A1 | 6/2006 | Rothschild ................. 358/3.28 |
| 2006/0216021 A1 | 9/2006 | Touchard et al. ............ 396/429 |

FOREIGN PATENT DOCUMENTS

| EP | 1 262 883 | 12/2002 |
| EP | 1 785 896 | 5/2007 |

OTHER PUBLICATIONS

A. Stent, et al., "Using Event Segmentation to Improve Indexing of Consumer Photographs", SIGIR Forum, (Dec. 9, 2001), pp. 59-65.

* cited by examiner

*Primary Examiner*—Debbie Le
(74) *Attorney, Agent, or Firm*—Justin D. Petruzzelli

(57) ABSTRACT

Various embodiments of the present invention pertain to the organizing of digital content by events, so that retrieval of such digital content in a manner meaningful and logical to users is achieved. In this regard, an event may be defined at least by event boundaries, such as a span of time, a geographic area, an acquirer of digital content, or a subject of digital content. Digital content that can be deemed to accord with the event boundaries may be associated with the event and made available for access and retrieval.

25 Claims, 7 Drawing Sheets

EVENT-BASED DIGITAL CONTENT RECORD ORGANIZATION

FIELD OF THE INVENTION

This invention relates generally to the field of digital image processing. In particular, various embodiments of the present invention pertain to event-based organization of digital content records, such as digital still images, digital videos, and digital audio files.

BACKGROUND OF THE INVENTION

Events in people's lives are one of the most popular motivations for capturing digital imagery. An event is an activity of common interest to one or more people that has a finite time duration occurring at one or more geographic locations. An event may be defined by, among other things, its unique combination of time, place, or participants. Events may be planned in advance or spontaneously occur. Some events may be recurring. People use digital content captured at private as well as public gatherings to relive memories and share experiences with others. Combining digital content from a plurality of event participants generates a richer experience when reliving an event.

At present, digital images and videos captured at events with digital still cameras, cell phones, video cameras and other random access digital capture devices are often shared between event participants using internet websites. These websites provide services such as online content storage, blogging areas, digital image print fulfillment, photo albums, CDs, and DVDs. Participants upload their digital content to the online website and organize the content into collections based on the events in which the content was captured. The collections, often called albums, are then proactively shared with others that attended the event by sending email invitations containing an event specific web address to those specified by the content owner. One example of this type of system is the Kodak EasyShare™ Gallery website, which requires knowing the email address of each event attendee.

While the above-described processes for organizing and sharing digital imagery are useful and effective, such processes can be improved.

SUMMARY

The above-described processes are improved and a technical solution is achieved in the art by a system and a method for event-based digital content organization according to various embodiments of the present invention. By organizing digital content by events, retrieval of digital content in a manner meaningful and logical to users is achieved.

In some embodiments of the present invention, digital content records, such as digital audio files, digital still images, digital video, etc., are received. The digital content records may be received from one or more users. According to embodiments of the present invention, at least some of the digital content records have associated metadata identifying at least a time-date of capture, a location of capture, or a time-date of capture and a location of capture. According to various embodiments, at least one of the digital content records has associated metadata identifying a time-date of capture, and at least one of the digital content records has associated metadata identifying a location of capture.

An event may be defined at least by identifying a set of event boundaries defining at least a span of time and a geographic area. By defining event boundaries at least by a span of time and a geographic area, digital content can be accurately associated with events. The event boundaries also may include an acquirer or subject of one or more digital content records. In this regard, at least some of the digital content records may also include metadata that identifies the acquirer or subject(s) of the corresponding digital content record. By defining event boundaries at least by a span of time, a geographic area, a digital-content-record acquirer, or a digital-content-record subject, digital content can be specifically or even more accurately associated with events.

According to some embodiments of the present invention, the set of event boundaries may be identified based at least upon user-input. Such a feature may be beneficial for, among other things, preplanned events.

According to some embodiments, the set of event boundaries may be identified based at least upon a review of the metadata associated with the digital content records. Such a feature may be beneficial for, among other things, ad-hoc or non-preplanned events.

Further in this regard, in embodiments of the invention where not all of the digital content records have associated therewith location-of-capture metadata, the geographic area may be identified based at least upon the location-of-capture metadata associated with the digital content records that contain such metadata. Similarly, in embodiments of the invention where not all of the digital content records have associated therewith time-date-of-capture metadata, the span of time may be determined based upon the time-date-of-capture metadata associated with the digital content records that contain such metadata. These features may be beneficial for, among other things, making intelligent decisions on event boundaries when some metadata is missing.

Digital content records ("event content-records") of the plurality of digital content records may be identified to be associated with the event. At least some of the digital content records may be identified as event-content records because they meet metadata conditions. An example of a metadata condition is that the time-date-of-capture metadata and the location-of-capture metadata of the corresponding digital content records identify a time-date-of-capture and a location-of-capture within the span of time and the geographic area, respectively. In embodiments of the invention where digital content records include acquirer metadata, the metadata conditions may include that the acquirer metadata identifies an acquirer within the acquirer event boundary, respectively. In embodiments of the invention where digital content records include subject metadata, the metadata conditions may include that the subject metadata identify a subject within the subject event boundary.

At least some of the event content-records may be associated with the event, and information identifying such association may be stored in a computer-accessible memory system and may be made available for access.

In some embodiments of the present invention, additional digital content records may be received. At least some of the additional digital content records may have associated therewith metadata as described above. In this regard, the set of event boundaries may be revised based at least upon the metadata associated with the additional digital content records. These features may be beneficial for, among other things, more accurately defining event boundaries as more metadata becomes available from additional digital content records.

According to various embodiments of the present invention, a request for at least one of the associated event-content-records is received. In response to the request, the requested associated event-content-record(s) is/are retrieved from the computer-accessible memory system and transmitted. The request may include an identification of a requestor submitting the request. In this regard, prior to executing the transmitting step, a validation that the requestor is authorized to receive the requested image-record(s) may be performed. Still further in this regard, prior to executing the transmitting, validation that a fee has been paid for the requested image-record(s) may be performed.

As with the validation actions described above, various embodiments of the present invention include security features. For example, some embodiments of the present invention pertain to verifying prior to, during, or after receiving all or a portion of the plurality of digital content records, that the digital content records originate from an authorized source, such as an authorized user, authorized acquirer, or contain or do not contain a particular subject, such as a person or object. The authorized sources or particular subjects may be identified via user-input. Some embodiments of the invention include as part of an authentication process, verifying that at least some of the metadata associated with the plurality of digital content records describe a time-date of capture and a location of capture within the event boundaries.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION

Various embodiments of the present invention pertain to the organizing of digital content records, such as digital still images, digital videos, and digital audio files. According to various embodiments of the present invention, such digital content records are organized by events, so that retrieval of such digital content records in a manner meaningful and logical to users is achieved. In this regard, an event may be defined at least by event boundaries, such as, for example, a span of time, a geographic area, an acquirer of digital content, or a subject of digital content. Digital content records that can be deemed to accord with the event boundaries may be associated with the event and made available for access and retrieval.

Event boundaries may be defined by a user, as may be pertinent for a preplanned event; may be defined based upon a review of metadata associated with a collection of digital content records, as may be pertinent for an ad-hoc or spontaneous event; or may be defined both by a user and by a review of metadata. Accordingly, embodiments of the present invention provide flexibility and intelligence for the accurate definition of event boundaries to ensure that digital content is effectively and properly associated with an event.

Further, embodiments of the present invention address security concerns associated with the addition, access, and retrieval of digital content by, for example, validating that digital content to be associated with an event comes from authorized sources and validating that digital content already associated with an event is distributed to authorized requesters.

Figure 1:
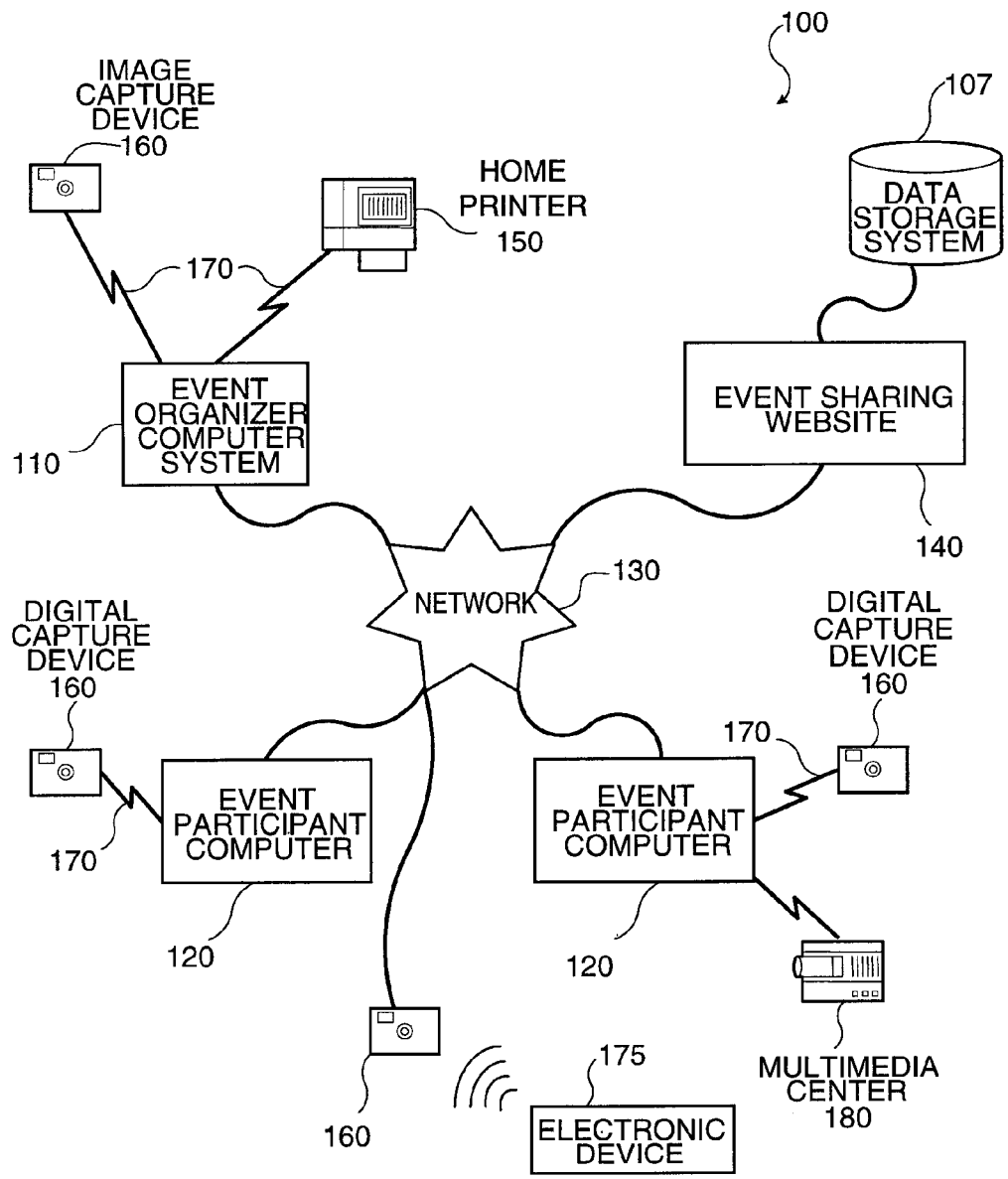
FIG. 1 illustrates a system, according to an embodiment of the present invention, for practicing the various methods of event-based digital content organization, according to embodiments of the present invention.

Referring now to FIG. 1, a system 100 for executing methods in accordance with various embodiments of the present invention is illustrated. In particular, the system 100 includes an event organizer computer system 110 and an event participant computer system 120 communicatively connected via, for example, a network 130, with an event sharing computer system 140. The event sharing computer system 140, according to this embodiment, is designed to provide digital content sharing among a plurality of users. The event sharing computer system 140 may be implemented, at least in part, as a website. In the particular embodiment illustrated, the event sharing computer system 140 is capable of storing digital content in a data storage system 107 on behalf of many users.

The phrase "computer system" is intended to include one or more computers, which in the case of plural computers, may or may not be communicatively connected to each other. The term "computer" is intended to include any data processing device, such as a desktop computer, a laptop computer, a mainframe computer, set-top box, a personal digital assistant, a Blackberry™, a cell phone, digital camera, digital media frame, games system, portable game system, or any other device for processing data, managing data, or handling data, whether implemented with electrical, magnetic, optical, biological components, or otherwise.

The phrase "communicatively connected" is intended to include any type of connection, whether wired, wireless, or both, between devices, computers, or programs in which data may be communicated. Further, the phrase "communicatively connected" is intended to include a connection between devices or programs, or both, within a single computer, a connection between devices or programs, or both, located in different computers, and a connection between devices not located in computers at all. In this regard, although the data storage system 107 is shown separately from the event sharing computer system 140, one skilled in the art will appreciate that the data storage system 107 may be stored completely or partially within the event sharing computer system 140. Further in this regard, although only the event sharing computer system 140 is illustrated as explicitly having a data storage system 107 communicatively connected thereto, one skilled in the art will appreciate that any of the computers referred to herein may have a data storage system communicatively connected thereto.

The system 100 allows for a number of users to communicate via the event organizer computer systems 110 or the event participant computer systems 120, with the event sharing computer system 140 to upload or access event related digital content. In the embodiment of FIG. 1, home printers 150, image capture devices 160, electronic devices 175, and multimedia centers 180 are peripherals communicatively connected to the event organizer computer systems 110 or the event participant computer systems 120 through a connection mechanism 170. As with any peripheral device, the image capture device 160 may act as its own stand-alone computer and may itself be directly communicatively connected to the event sharing computer system 140. Alternatively, such peripherals may be integrated into the computer systems 110, 120, although they are shown separately in FIG. 1. The Kodak EasyShare™ One is such a camera that can, by way of example, but not limitation, connect directly to an event sharing computer system such as the Kodak EasyShare™ Gallery website.

Figure 2:
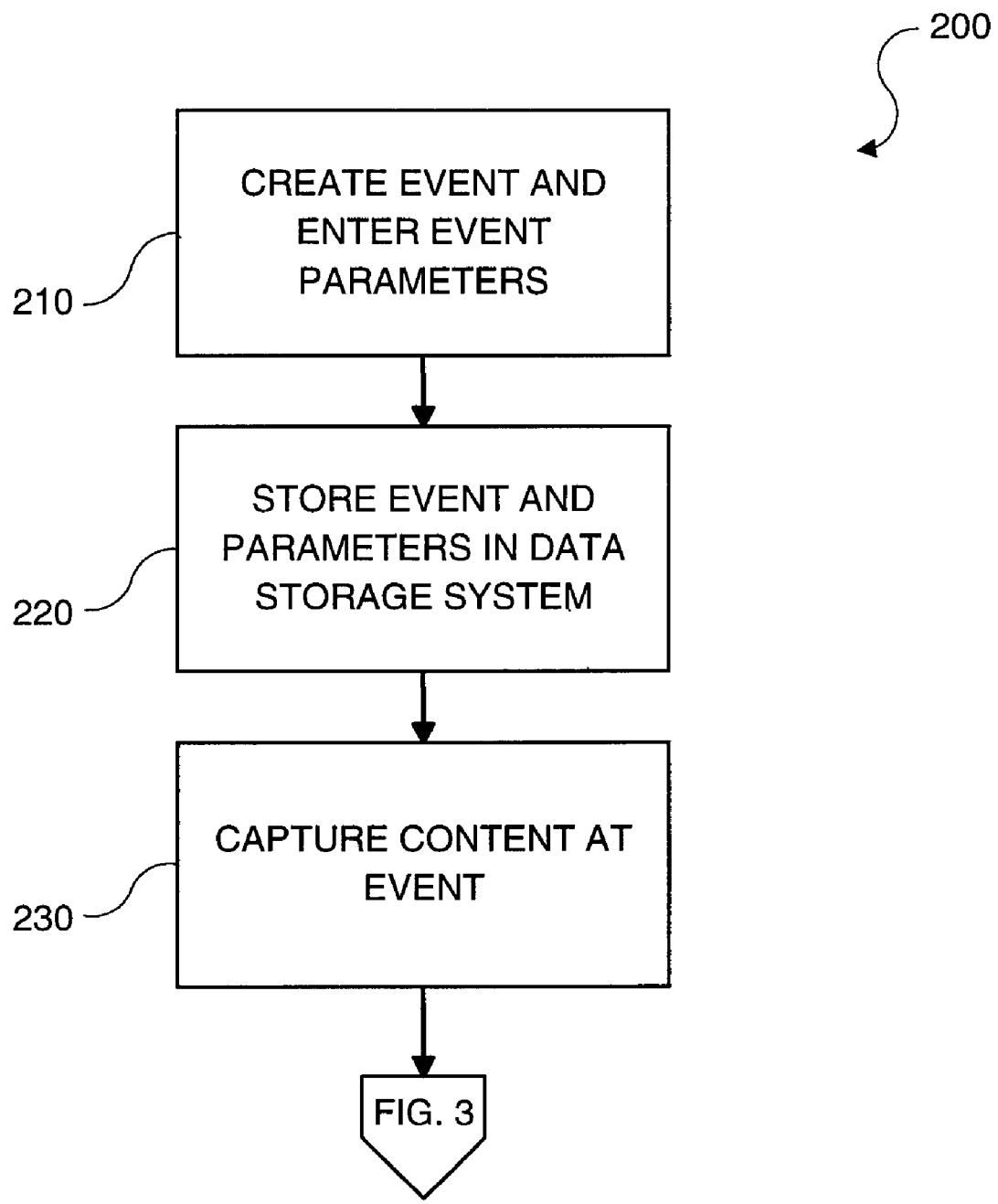
FIG. 2 illustrates a workflow involved with creating a planned event album, according to an embodiment of the present invention.
Figure 4:
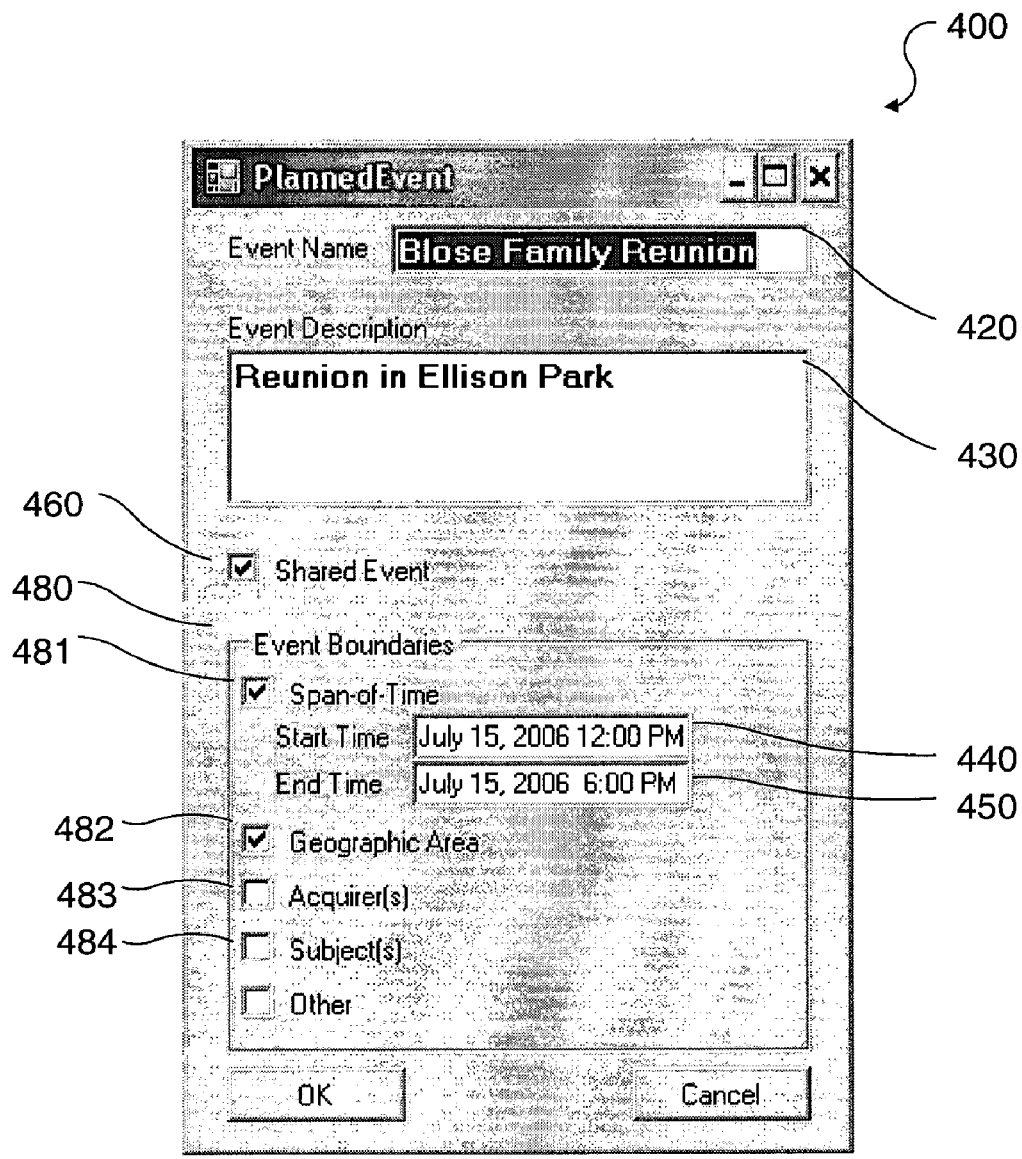
FIG. 4 is a screen shot of a computer display device, illustrating a sample planned event data input screen, according to an embodiment of the present invention.

Referring to the embodiment of FIG. 2, there is shown a flow diagram 200 illustrating how an event organizer using event organizer computer system 110 is able to generate an event with a specified security descriptor on the event sharing computer system 140 for a planned event. At step 210, the event organizer accesses the event sharing computer system 140 using event organizer computer system 110 to generate an event. A planned event creation screen (400 in FIG. 4, for example) is displayed on the event organizer computer system 110, and event parameters, which may including event boundaries 480, for example, may be entered. In the embodiment of FIG. 4, the event parameters include the name of the event 420 and an event description 430. The event parameters also may include an indication 460 of whether digital content records ultimately associated with the event may be shared.

Examples of event boundaries 480 include a span-of-time event boundary 481, a geographic area event boundary 482, an acquirer(s) of digital content boundary 483, and a subject(s) of digital content boundary 484. The span-of-time event boundary 481 may be identified by a start time 440 and an end time 450 of the event.

Figure 7:
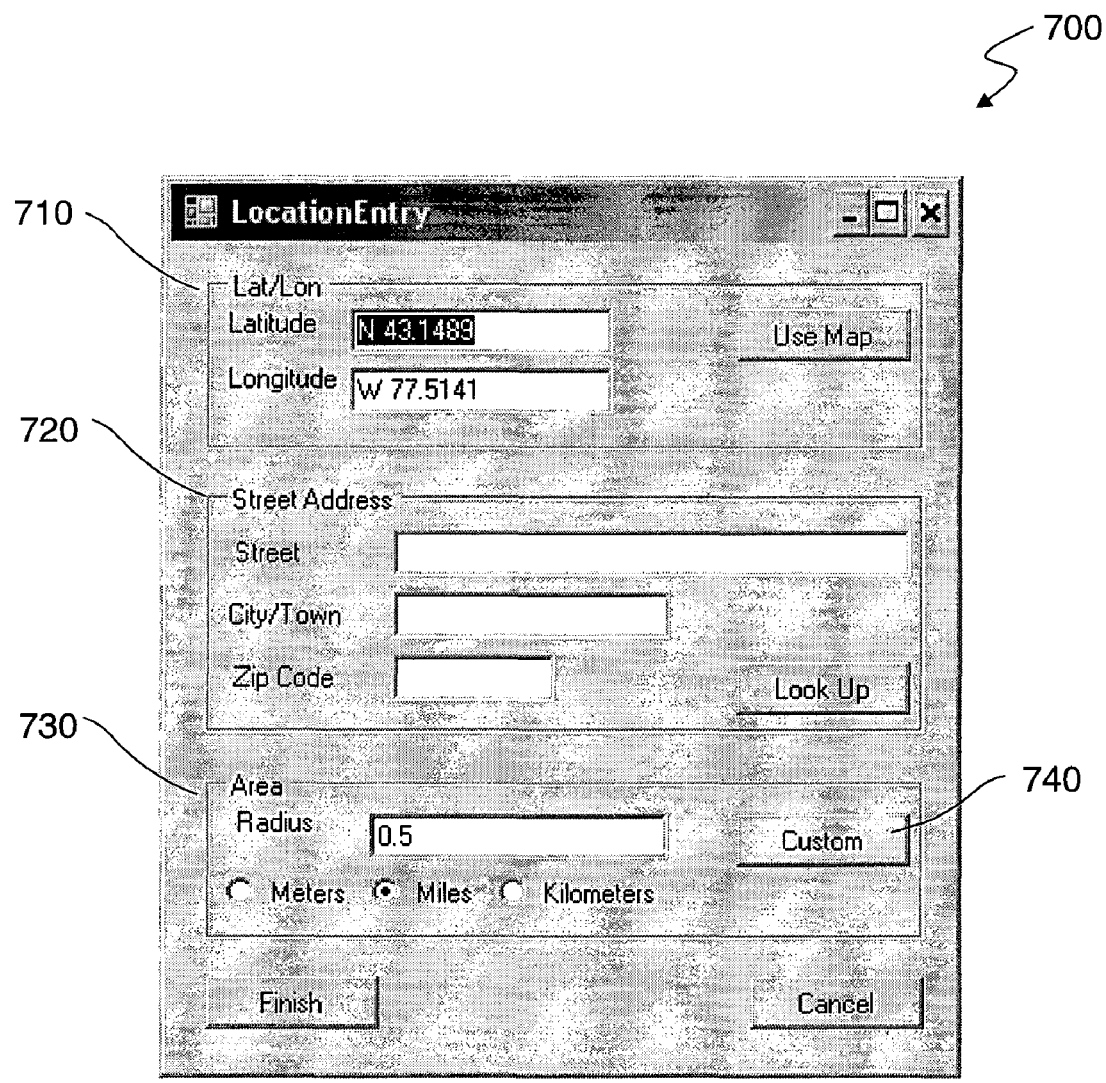
FIG. 7 illustrates how geographic area boundaries for the event may be defined, according to an embodiment of the present invention.

FIG. 7 illustrates how geographic area boundaries for the event may be defined, for example, in a location entry screen 700 displayed by an event organizer computer in a system 110, according to an embodiment of the present invention. In this embodiment, an event organizer may specify, for example, the geographic area boundaries by specifying (a) a centroid of the event's location, and (b) a radius from the centroid. The centroid location may be specified by, for example, a latitude and longitude 710, a street address 720, or any other technique for identifying a location. Alternatively, although not shown in FIG. 7, the centroid may be identified dynamically, for example, by acquiring a location in real time from a Global Positioning System ("GPS") device, a cell phone, or any other device capable of revealing its location. For instance, an event planner may specify that the centroid is to be identified at a later time when the event sharing computer system 140 receives a location information from a cell phone having a particular phone number. Alternatively, the geographic area boundary for an event may be identified by using the network address of a network access point accessed in common by digital capture devices at the event. For instance, the digital capture devices may record with each captured image the network address of a wireless access point. Captured images may be subsequently grouped into events by grouping images whose metadata indicates they were both captured at the same location, as identified by the network address, and at approximately the same time. An algorithm such as K-means, known in the art, may be used to separate assets taken at the same location but over a range of times into separate events. Although this paragraph describes specific examples of how to define a geographic area, one skilled in the art will appreciate that any way of identifying a geographic area may be used, as signified by the availability of the custom button 740.

Returning to FIG. 4, the acquirer(s) of digital content boundary 483 is another tool, in addition to the other event boundaries, used by the event sharing computer system 140 for identifying which digital content records should be associated with an event. The acquirer(s) of digital content boundary 483 identifies particular digital-content-record acquirers that can have their digital content records associated with the event defined at step 210 in FIG. 2.

For example, a digital camera may have a setting that allows the user of the digital camera, i.e., the acquirer of the digital images captured by the digital camera, to be identified in metadata associated with the acquired images. Such identification of the acquirer may occur by a manual inputting of the acquirer's name into the digital camera, for example, via a biometric scanning device, or any other manner of inputting such information. When attempting to associate digital content records with an event, the event sharing computer system 140 may compare the acquirer identified in the digital-content-record metadata with the set of, i.e., one or more, acquirers identified in the acquirer(s) of digital content boundary 483. If a match is found, and other 'metadata conditions' are met, the event sharing computer system 140 associates the digital content record with the event.

The subject(s) of digital content boundary 484 identifies a set of particular subjects, such as people or any other object, identifiable in a digital content record. If one or more (depending upon the particular metadata conditions used) of the particular subjects are identified in a digital content record, then, subject to other metadata conditions, the digital content record may be associated with the event defined at step 210 in FIG. 2.

For example, the subject(s) of digital content boundary 484 may identify a particular person by face data and by voice data. When attempting to associate digital content records with an event, the event sharing computer system 140 may scan a digital audio file for a voice pattern matching the voice data identified in the digital content boundary 484. If a match is found, and other 'metadata conditions' are met, the event sharing computer system 140 associates the digital audio record with the event.

Similarly, the event sharing computer system 140 may scan a digital video file for a voice pattern in the audio component of the digital video file matching the voice data identified in the digital content boundary 484, a face pattern in the video component of the digital video file matching the face data identified in the digital content boundary 484, or both a matching voice pattern and face pattern matching the voice data and the face data, respectively. If a match is found, and other 'metadata conditions' are met, the event sharing computer system 140 associates the digital video record with the event.

Referring back to FIG. 2, in the next step 220, the event sharing computer system 140 may save the event parameters defined at step 210 in the data storage system 107. In step 230, a user, such as an event organizer or an event participant, captures digital content records at an event with image capture device 160 or some other digital content capturing device.

Figure 3:
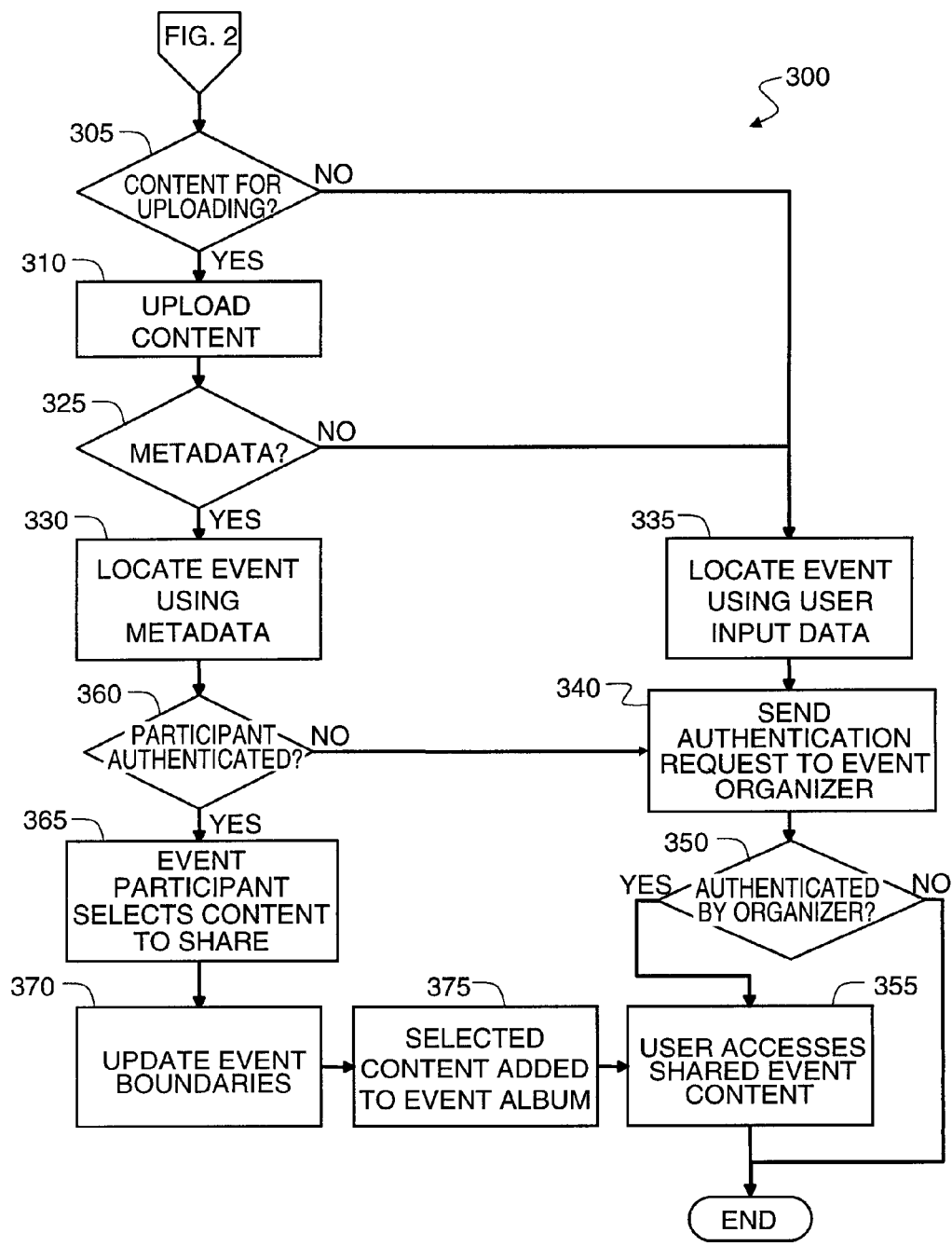
FIG. 3 illustrates a workflow involved with uploading digital content and authenticating event participants for a planned event, according to an embodiment of the present invention.

Referring to FIG. 3, there is illustrated a continuation 300 of the flow diagram 200. The embodiment of FIG. 3 illustrates a workflow involved with uploading digital content and authenticating event participants for a planned event, according to an embodiment of the present invention. In addition, the embodiment of FIG. 3 shows how event participants without digital content or non-participants may gain access to uploaded digital content.

If a user interacting via a computer system (110, 120 in FIG. 1, for example) with the event sharing computer system 140 has digital content records to be uploaded ("yes" for decision box 305), the user, in this case, an event participant, uploads such digital content records to the event sharing computer system 140 at step 310. Each of the digital content records may have metadata associated therewith indicating, without limitation, a time-date of capture of the digital content record; a location of capture of the digital content record; an identification of the acquirer of the digital content record; or one or more subjects identified in the digital content record. Such metadata may be developed or associated with the digital content records using any technique known in the art, such as time stamping a time-date of creation for the time-date of capture metadata, GPS-provided location information for the location of capture metadata, network device MAC address, IP address, or other network address information for the communicatively connected or capable-of-being-communicatively-connected network device that may provide network access to the capture device, manual input or biometric acquisition of information identifying an acquirer of a digital content record for the acquirer metadata, or conventional voice or subject recognition processing techniques for the subject metadata.

According to various embodiments of the present invention, metadata for digital content records may be generated by a computer in lieu of the capturing device for one or more of the digital content records received at step 310 by the event sharing computer system 140. For example, it may be that the set of digital content records uploaded at step 310 were acquired by multiple capture devices. Accordingly, it may be that some of the records have metadata and others do not. In one embodiment of the present invention, the event sharing computer system 140 reviews the metadata of digital content records that contain it, and generates metadata for at least some of the other digital content records by interpolation. For example, if three digital content records are uploaded at step 310, the first indicating a time-date of capture on "X" date at 3:00 PM, the second including no metadata, and third indicating a time-date of capture on "X" date at 3:30 PM, time-date of capture metadata may be generated by the event sharing computer system 140 for the second record specifying "X" date at 3:15 PM.

Further in this regard, if almost no or few digital content records contain metadata, contextual information or the content of the records may be reviewed, using techniques known in the art, to make intelligent estimations of what the metadata should be. For example, without limitation, images may be scanned for daylight or length of shadows to determine a time of capture. Or, if acquirer metadata does not exist, it may be implied by the username of the person uploading the content at step 310. As another example, the user may be prompted to manually input such metadata. These metadata generation techniques may occur at step 310 by the event sharing computer system 140 or may occur prior to uploading by another computer or computer system.

During the upload, the event sharing computer system 140 determines whether the digital content records include the metadata described above with respect to step 310. If such metadata exists ("yes" for decision box 325), it is used to locate the event in the data storage system 107 in step 330. In this case at step 330, according to an embodiment of the present invention, the digital-content-record metadata is evaluated against metadata conditions to determine which event or events, if any, such records may be associated with.

Metadata conditions facilitate identifying which digital content records may be associated with which event, and may be predetermined or user specified, for example, via a user-interface such as that shown in FIG. 4. Metadata conditions may include comparing the digital-content-record metadata to the event boundaries identified at step 210. For example, a metadata condition may be that the time-date-of-capture metadata and the location-of-capture metadata of a digital content record identify a time-date-of-capture and a location-of-capture within the span of time event boundary and the geographic area event boundary, respectively. Such a metadata condition identifies an unambiguous location in time-space, which, in turn, may be used to unambiguously identify an event. A metadata condition also may be that the time-date-of-capture metadata and the subject metadata of a digital content record identify a time-date-of-capture and one or more subjects within the span of time event boundary and the subject event boundary, respectively. Since an object can be at only one place at one time, this type of metadata condition also identifies an unambiguous location in time-space, which, in turn, may be used to unambiguously identify an event.

It should be noted that metadata conditions need not require that data values identified by digital-content-record metadata fall within an event boundary and need not compare metadata with event boundaries on an individual digital-content-record-by-record basis. For example, a metadata condition may specify that a particular percentage of the time-date of capture metadata of all of the digital content records fall within a span-of-time event boundary and that none of the time-data of capture metadata fall more than a particular duration outside of the span-of-time event boundary. For instance, if a span-of-time boundary is between 3:00 PM and 6:00 PM on a particular Saturday, a metadata condition may require that more than 70% of the time-date-of capture metadata of all digital content records specify a time on such Saturday between the 3:00 PM to 6:00 PM span-of-time event boundary, and that no time-date of capture metadata specify a time 30 minutes before or after such event boundary. If four digital content records are uploaded, each with respective time-date-of capture metadata identifying times of 5:45 PM, 5:53 PM, 5:59 PM, and 6:08 PM, respectively, on the relevant Saturday, this metadata condition would be met. In particular, 75% of the records specify a time-date of capture within the span-of-time event boundary, and none of the records specify a time-date of capture before 2:30 PM or after 6:30 PM.

After event(s) is/are identified at step 330, the authenticity of the event participant (i.e., the source of the uploaded digital content records) may be validated at decision box 360. Part of the validation process at step 360 may be to ensure that the participant has paid a fee for accessing the event sharing computer system 140. If the event participant is authenticated, "yes" for decision box 360, the event participant may select which of their uploaded content he or she wishes to share with other participants in step 365. Content not selected for sharing can be put in a private area for the user.

At step 370, according to an embodiment of the present invention, if the digital content records to be associated with a selected event included metadata information outside one or more event boundaries, such event boundaries may be revised. For example, if a span-of-time boundary for the selected event is between 3:00 PM and 6:00 PM on a particular Saturday, and the digital content records to be associated with the event included respective time-date-of capture metadata identifying times of 5:45 PM, 5:53 PM, 5:59 PM, and 6:08 PM, respectively, the span-of-time event boundary may be expanded to be from 3:00 PM to 6:08 PM at step 370. At step 375, the association between the digital content records and the selected event is stored, optionally as an album, and access thereto is provided at step 355.

If it is determined at step 325 that the digital content records uploaded at step 310 do not have metadata or do not have sufficient metadata to associate the records with events, the user that uploaded such records may be prompted to manually identify an event at step 335. Using the data entered in step 335, the event sharing computer system 140 locates the event and may send the event organizer a request to authenticate the user in step 340. If the event organizer authenticates the user, "yes" for decision box 350, the user is allowed access in step 355.

Figure 5:
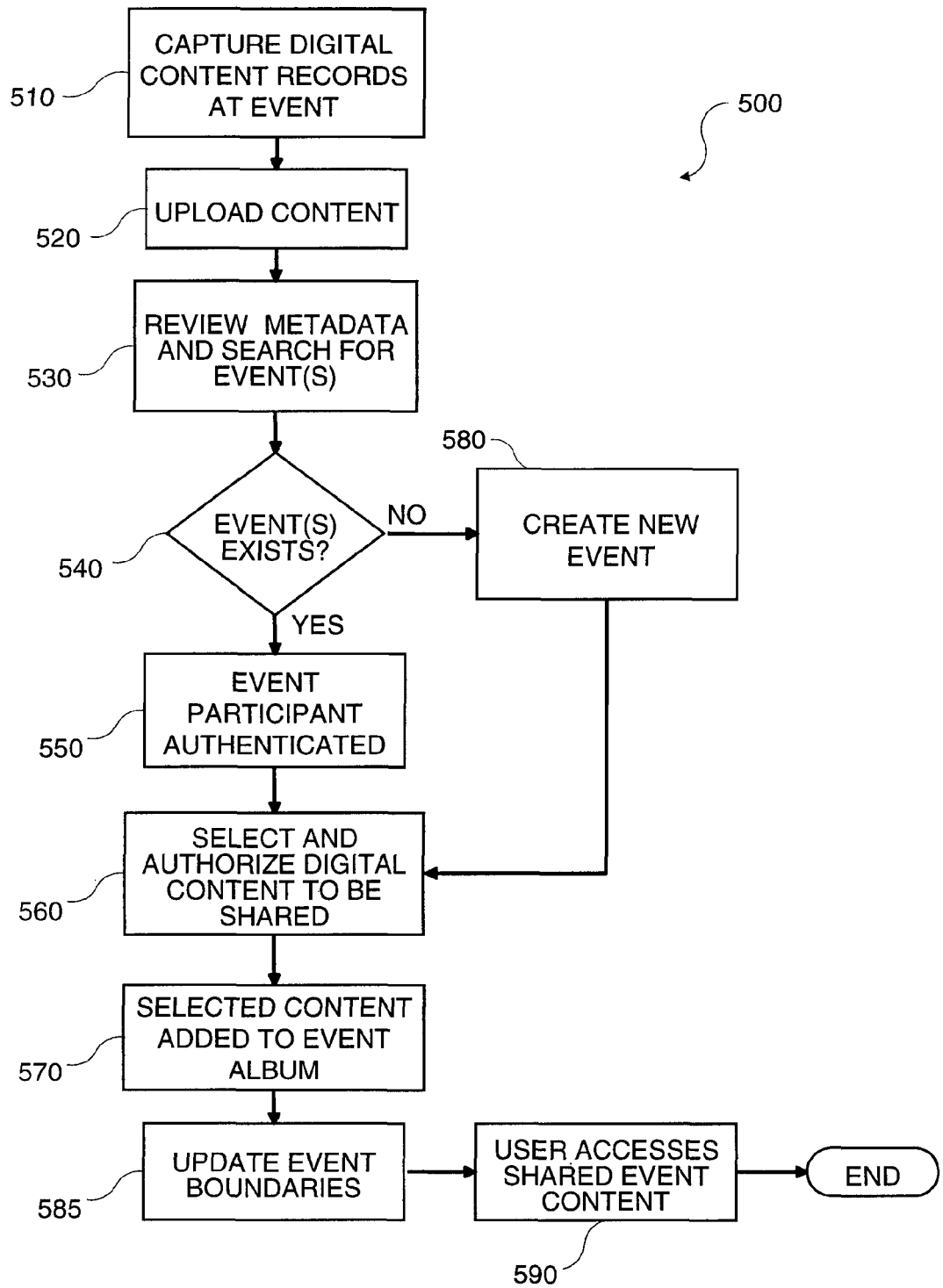
FIG. 5 illustrates a workflow involved with an ad-hoc event, according to an embodiment of the present invention.

Referring now to the embodiment of FIG. 5, a flow diagram 500 illustrates how an event participant using an event participant computer system 120 is able to generate an event and an associated album containing event digital content on the event sharing computer system 140 for a spontaneous or ad hoc event. In step 510, a user, such as an event organizer or an event participant, captures digital content records at an event with image capture device 160 or some other digital content capturing device. Using a computer system, such as 110 or 120, the user uploads the digital content to the event sharing computer system 140 in step 520.

As discussed above in connection with step 310 in FIG. 3, some or all of the digital content records uploaded at step 520 may have metadata associated with them or may have metadata generated for them. In this regard, at step 530, in an attempt to identify one or more events to which the uploaded digital content records may be associated, the event sharing computer system 140 evaluates such metadata with respect to the metadata conditions associated with each event identified in the data storage system 107, as previously discussed.

If one or more events are identified at step 540 ("yes" at decision box 540), the user may be prompted (not shown in FIG. 7) with a choice of the one or more of the events identified at step 540 to which the uploaded digital content records is to be associated. On the other hand, the digital content records may be associated with all of the events identified at step 540 without user prompting. At step 550, the user, i.e., a source of the digital content records uploaded at step 520, is authenticated to ensure that such user is allowed to associate the uploaded content with the selected event(s). If authentication succeeds at step 550, the user may select which, if any, of the uploaded digital content records should be associated with the selected event(s), or associated with the selected event(s) and shared with others at step 560.

Figure 6:
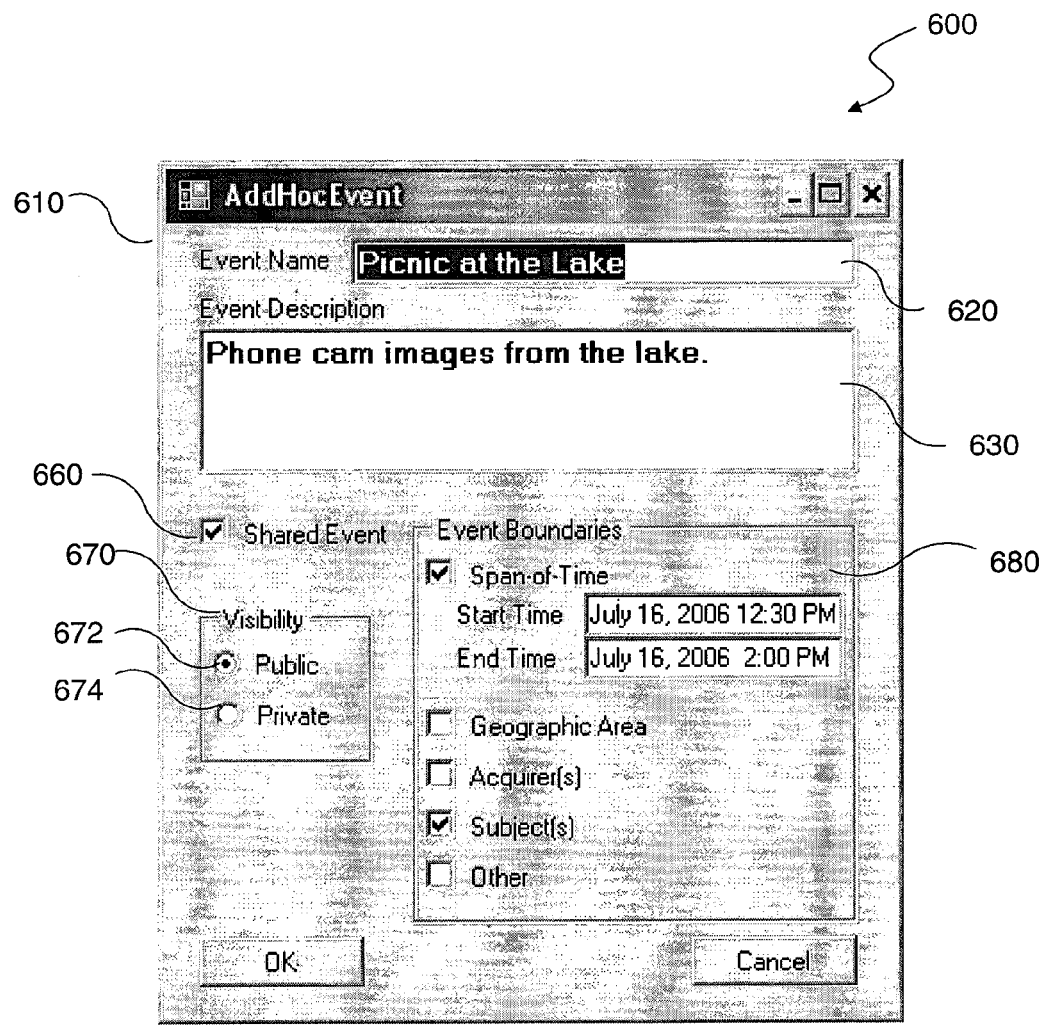
FIG. 6 is a screen shot of a computer display device illustrating a sample ad hoc event data input screen, according to an embodiment of the present invention.

If no events are identified at step 540, the event participant may generate a new event and specify event boundary conditions. For example, in step 580, the event sharing computer system 140 may display an ad hoc event creation screen 610 in FIG. 6, for example, on the event participant computer system 120. In the particular embodiment illustrated in FIG. 6, the user has the opportunity to specify event parameters, which may include event boundaries, as previously discussed. The event parameters may include the name of the event 620 and an event description 630. The event parameters also may include an indication 660 of whether digital content records ultimately associated with the event may be shared. Visibility box 670 allows further refinement of how such digital content records are to be shared. In particular, in this embodiment, if the digital content records are to be shared, as indicated by a selection of the box 660, such records may be shared publicly with a selection of dot 672 or may be shared privately with a selection of dot 674. Public visibility may allow non-participants access to the event content and private visibility may only allow participants access to the digital content records. If the visibility is private, the user may specify criteria for determining which participants will be granted access to the digital content records. Further, the user may specify event boundaries as previously discussed at box 680, in order to define which digital content records may be associated with this event.

Using the event data entered by the event participant, the online sharing computer system generates 140 a new ad hoc event completing step 580. Subsequently, at step 560, the user may select which, if any, of the uploaded digital content records should be associated with the new event, or associated with the new event and shared with others.

At step 570, the digital content records to be associated with the event or events are associated, and such association(s) may be stored in the data storage system 107.

As with step 370 in FIG. 3, according to an embodiment of the present invention, if the digital content records associated with the event(s) include metadata information outside one or more event boundaries, such event boundaries may be revised at step 585. At step 590, the user may access his or her shared event content, as well as the shared event content from other participants, depending upon security settings.

It is to be understood that the exemplary embodiments are merely illustrative of the present invention and that many variations of the above-described embodiments can be devised by one skilled in the art without departing from the scope of the invention. For example, although the workflows illustrated in the figures reveal a particular ordering of steps, one skilled in the art will appreciate that the invention is not limited to such particular ordering and that some steps may occur at different places in the workflows. For instance, FIGS. 3 and 5 illustrate user authentication steps 360 and 560, respectively, after the uploading of digital content records at steps 310 and 520, respectively. However, one skilled in the art will appreciate that workflows according to other embodiments of the present invention may perform user authentication at various different times in such workflows. For another example, FIGS. 3 and 5 illustrate the user's ability to access shared event content at steps 355 and 590, respectively, after the user uploads and shares the user's own content at steps 365 and 560, respectively. However, one skilled in the art will appreciate that workflows according to other embodiments of the present invention may allow a user to access shared event content before sharing the user's own content or without sharing the user's own content. In addition, although examples used herein discuss the charging of a fee for access to requested digital content records and access to event sharing computer systems, one skilled in the art will appreciate that fees may be charged for any transmission of information, not just the transmission of digital content records. For example, the image records described herein have associated metadata, and users may be charged for access to such metadata. In this regard, it is therefore intended that all such variations be included within the scope of the following claims and their equivalents.

PARTS LIST

100 drawing
107 data storage system
110 event organizer computer system
120 event participant computer system
130 network
140 event sharing website
150 home printer
170 connection 175 electronic device
180 multimedia center
200 drawing
210 step
220 step
230 step
300 drawing
305 decision box
310 step
325 decision box
330 step
335 step
340 step
350 decision box
355 step
360 decision box
365 step
370 step
375 step
400 drawing
420 text box
430 text box
440 text box
450 text box
460 check box
480 group box
481 check box
482 check box
483 check box
484 check box
500 drawing
510 step
520 step
530 step
540 decision box
550 step
560 step
570 step
580 step
585 step
590 step
600 drawing
620 text box
630 text box
660 check box
670 group box
672 radio button
674 radio button
680 group box
700 drawing
710 group box
720 group box
730 group box
740 button

What is claimed is:

1. A method implemented at least in part by a computer system, the method for organizing digital content records and comprising the steps of:

receiving a plurality of digital content records, at least some of said digital content records having associated metadata identifying at least a time-date of capture, a location of capture, or a time-date of capture and a location of capture, wherein at least one of the digital content records has associated metadata identifying a time-date of capture, and at least one of the digital content records has associated metadata identifying a location of capture;

defining an event at least by identifying a set of event boundaries associated at least with a span of time and a geographic area;

identifying digital content records ("event content-records") of the plurality of digital content records to be associated with the event, at least some of the digital content records being identified as event-content records because they meet metadata conditions, wherein the metadata conditions include that the time-date-of-capture metadata and the location-of-capture metadata of the corresponding digital content records identify a time-date-of-capture and a location-of-capture within the span of time and the geographic area, respectively;

associating at least some of the event content-records ("associated event-content-records") with the event;

storing information identifying the association of the at least some of the event content-records with the event in a computer-accessible memory; and wherein the location-of-capture metadata identifies a network address of a network access point, wherein the geographic area event boundary is defined at least in part by a particular network address, and wherein the metadata conditions include that the network address correspond to the particular network address.

2. The method of claim 1, wherein at least two of the digital content records have associated metadata identifying a time-date of capture, and at least two of the digital content records have associated metadata identifying a location of capture.

3. The method of claim 1, wherein the set of event boundaries is identified based at least upon user-input.

4. The method of claim 1, wherein the set of event boundaries is identified based at least upon a review of the metadata associated with the digital content records.

5. The method of claim 4, wherein the span of time is inclusive of all time-dates-of-capture identified by the time-date-of-capture metadata associated with the digital content records.

6. The method of claim 4, wherein the geographic area is inclusive of all locations-of-capture identified by the location-of-capture metadata associated with the digital content records.

7. The method of claim 1, wherein not all of the digital content records have associated therewith location-of-capture metadata, and wherein the geographic area is identified based at least upon the location-of-capture metadata associated with the digital content records that contain such metadata.

8. The method of claim 1, wherein not all of the digital content records have associated therewith time-date-of-capture metadata, wherein the span of time is determined based upon the time-date-of-capture metadata associated with the digital content records that contain such metadata.

9. The method of claim 1, further comprising the step of verifying that the plurality of digital content records originate from an authorized source.

10. The method of claim 9, wherein authorized sources include people that acquired digital content records.

11. The method of claim 9, further comprising the step of receiving user input identifying a set of authorized sources, wherein the verifying step verifies that the plurality of digital content records originate from an authorized source in the set of authorized sources.

12. The method of claim 9, wherein the verifying step verifies that at least some of the metadata associated with the plurality of digital content records describe a time-date of capture and a location of capture within the event boundaries.

13. The method of claim 1, wherein the metadata associated with at least some of the digital content records identifies a source of the corresponding digital content record, and wherein the metadata conditions include that the source metadata identifies an authorized source.

14. The method of claim 13, wherein the source metadata identifies a person that acquired the corresponding digital content record.

15. The method of claim 13, further comprising the step of receiving user input identifying a set of authorized sources, wherein the metadata conditions include that the source metadata identifies an authorized source from the set of authorized sources.

16. The method of claim 1, further comprising the steps of:
receiving a request for at least one of the associated event-content-records;
retrieving, in response to the request, the requested associated event-content-record(s) from the computer-accessible memory system; and
transmitting the requested image-record(s) in response to the request.

17. The method of claim 16, wherein the request comprises an identification of a requestor submitting the request, and the method further comprises the step of: prior to executing the transmitting step, validating that the requestor is authorized to receive the requested image-record(s).

18. The method of claim 16, further comprising the step of: prior to executing the transmitting step, validating that a fee has been paid for the requested image-record(s).

19. The method of claim 1, further comprising the steps of: receiving additional digital content records, at least some of the additional digital content records having associated metadata identifying at least a time-date of capture, a location of capture, or a time-date of capture and a location of capture; and
revising the set of event boundaries based at least upon the metadata associated with the additional digital content records.

20. The method of claim 19, wherein the plurality of digital content records are received from a first user and the additional digital content records are received from a second user.

21. The method of claim 1, wherein the receiving step comprises receiving some of the plurality of digital content records from a first user and receiving some of the plurality of digital content records from a second user.

22. The method of claim 1,
wherein the set of event boundaries further includes an acquirer of one or more digital content records,
wherein the metadata associated with at least some of the digital content records further includes an identification of a photographer of the corresponding digital content record, and
wherein the metadata conditions further include that the photographer metadata identifies a photographer within the photographer event boundary.

23. The method of claim 1, wherein the set of event boundaries further includes a subject or object of one or more digital content records, wherein the metadata associated with at least some of the digital content records further includes subject metadata including an identification of a subject of or object in the corresponding digital content record, and
wherein the metadata conditions further include that the subject metadata identifies a subject or object within the subject event boundary.

24. The method of claim 1, further comprising the step of determining time-date of capture metadata or location-of-capture metadata for one of the digital content records based at least upon contextual information or content information from the corresponding digital content record.

25. A system for organizing digital content records, the system comprising:
a data storage system; and
a computer system communicatively connected to the data storage system and configured at least to:
receive a plurality of digital content records from the data storage system, at least some of said digital content records having associated metadata identifying at least a time-date of capture, a location of capture, or a time-date of capture and a location of capture, wherein at least one of the digital content records has associated metadata identifying a time-date of capture, and at least one of the digital content records has associated metadata identifying a location of capture;
define an event at least by identifying a set of event boundaries associated at least with a span of time and a geographic area;
identify digital content records ("event content-records") of the plurality of digital content records to be associated with the event, at least some of the digital content records being identified as event-content records because they meet metadata conditions, wherein the metadata conditions include that the time-date-of-capture metadata and the location-of-capture metadata of the corresponding digital content records identify a time-date-of-capture and a location-of-capture within the span of time and the geographic area, respectively;
associate at least some of the event content-records ("associated event-content-record 5") with the event;
store information identifying the association of the at least some of the event content-records with the event in the data storage; and
wherein the location-of-capture metadata identifies a network address of a network access point, wherein the geographic area event boundary is defined at least in part by a particular network address, and wherein the metadata conditions include that the network address correspond to the particular network address.

* * * * *

UNITED STATES PATENT AND TRADEMARK OFFICE
CERTIFICATE OF CORRECTION

PATENT NO. : 7,730,036 B2  Page 1 of 1
APPLICATION NO. : 11/750540
DATED : June 1, 2010
INVENTOR(S) : Andrew C. Blose et al.

It is certified that error appears in the above-identified patent and that said Letters Patent is hereby corrected as shown below:

| Issued Patent Column | Line | Description of Error |
|---|---|---|
| 12 | 18 | In Claim 1, delete "memory; and" and insert -- memory system; and --, therefor. |
| 14 | 44 (Approx.) | In Claim 25, delete "record 5")" and insert -- records") --, therefor. |
| 14 | 47 (Approx.) | In Claim 25, delete "storage; and" and insert -- storage system; and --, therefor. |

Signed and Sealed this

Thirty-first Day of August, 2010

David J. Kappos
*Director of the United States Patent and Trademark Office*